INVENTOR
W. P. GORZEGNO
By John Maier, III
ATTORNEY

Aug. 2, 1966 W. P. GORZEGNO 3,263,422
POWER PLANT VAPOR GENERATOR
Filed June 10, 1965 4 Sheets-Sheet 2

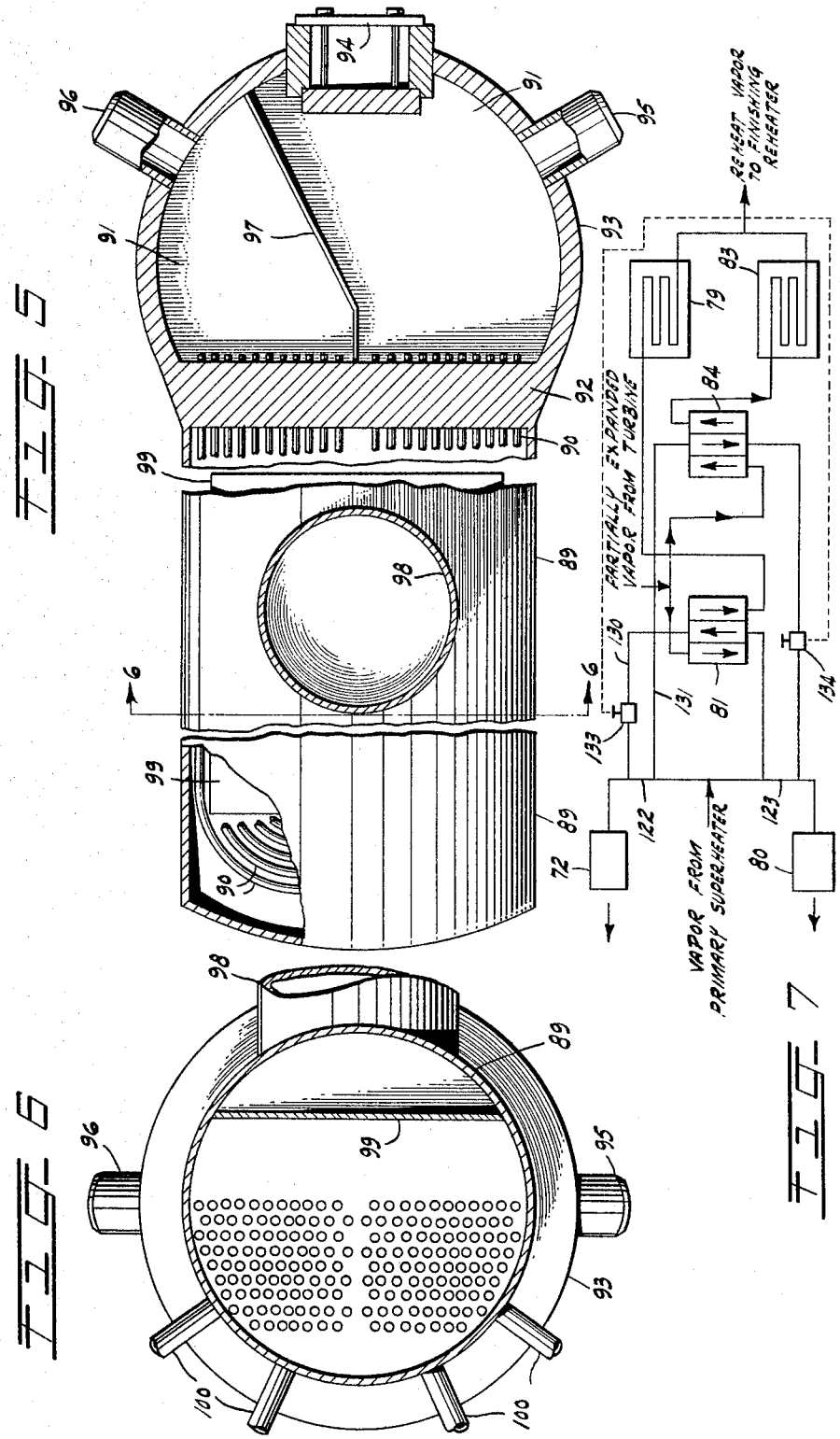

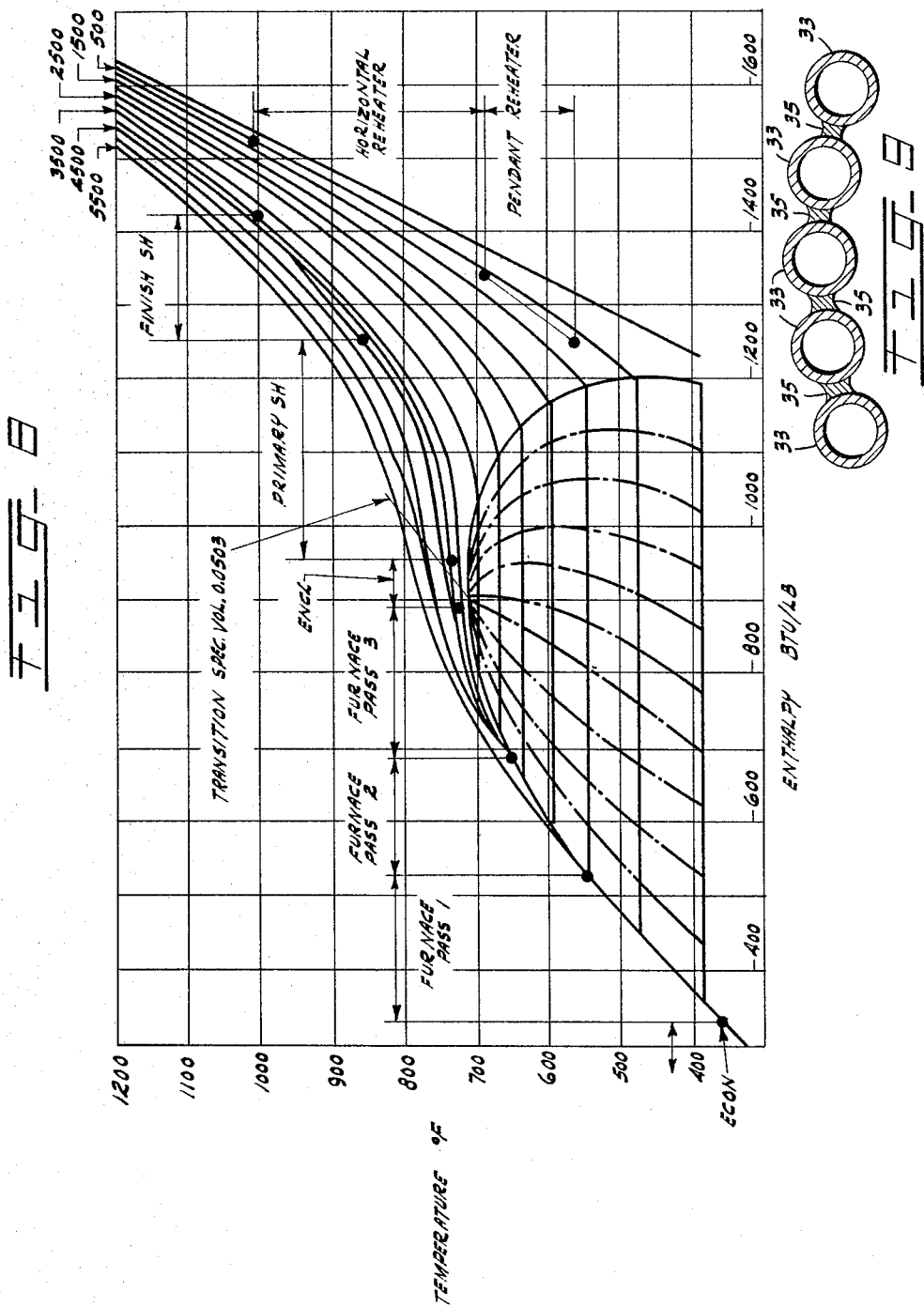

United States Patent Office 3,263,422
Patented August 2, 1966

3,263,422
POWER PLANT VAPOR GENERATOR
Walter P. Gorzegno, Florham Park, N.J., assignor to Foster Wheeler Corporation, New York, N.Y., a corporation of New York
Filed June 10, 1965, Ser. No. 462,860
6 Claims. (Cl. 60—39.18)

This invention relates to the construction and operation of vapor generators and more particularly to the construction and operation of once-through vapor generators for use in a power plant which includes a gas turbine. Use of the terms "vapor generator" or "steam generator" includes not only generators which utilize water as a vaporizable fluid but generators which utilize other vaporizable fluids as well.

Annual average generating costs of steam electric plants has been reduced historically by increasing the temperature and pressure at the turbine throttle, thus lowering the plant heat rate. Further improvement in using this approach is usually not economically justified because of the excessive cost of material capable of service at the necessarily higher temperatures. In recent years, since system sizes have become much larger, there has been a trend toward progressively larger unit sizes as a means of reducing costs. However, a practical upper limit of single-unit, steam generating sizes is being reached at about the 1000 mw. level. One immediately applicable method of reducing steam generating first cost, and possibly average annual generating costs, is to supercharge the steam generator by using a gas-turbine driven compressor to furnish combustion air. Hot exhaust gases issuing from the steam generator at high pressure drives the gas turbine. Since supercharging reduces the amount of heating surface required, resulting in size and weight reduction, great potential exists for reducing plant first cost by supercharging the steam generator of any steam cycle. This approach, however, is applied most advantageously to the supercritical pressure, once-through, steam generator because the large and costly steam drum is eliminated together with the risers and downcomers which require numerous penetrations of the outer or pressure containment shell. Furthermore, one-through circuitry permits greater freedom in surface arrangement and location. In addition, the circuit design particularly in the furnace, can more easily accommodate the higher absorption rates.

The supercharged steam generating unit of this invention preferably utilizes a cycle in which the temperature of the gas through the gas turbine is raised only high enough in value so that the gas turbine furnishes the required power to drive just a compressor to pressurize the steam generator. However, this invention can be utilized in the production of additional electricity by the gas turbine.

Therefore, it is an object of this invention to provide a supercharged, once-through, vapor generator of improved and more economical construction and operation.

In accordance with this invention, a chamber formed of fin tubes is encased by an outer containment shell. The chamber has a left vertical section, a right vertical section, a central vertical section, and a horizontal section. The left vertical section, right vertical section, and central vertical section are connected at their upper ends by the horizontal section. Air is supplied to burners located at the lower ends of the left vertical section and the right vertical section through a passageway which includes a space formed between the outer containment shell and the chamber. Superheater tubes are located within the central vertical section and horizontal section and receive the heated fluid from the heating tubes forming the chamber. The superheater tubes are connected for series flow with the vapor turbine. Following partial expansion, as is the usual practice, the fluid partially expanded within the turbine is reheated in reheater tubes. The reheater tubes are located within the central vertical section and the horizontal section and are connected for flow to and from the vapor turbine. A control valve in conjunction with a heat exchanger is provided to maintain a predetermined reheat temperature. The gases of combustion are discharged at the lower end of the central vertical section which is connected to the gas turbine.

The invention may be better understood from the following detailed description considered in conjunction with the accompanying drawings in which:

FIGURE 5 is a side elevation partially in cross section of a control heat exchanger utilized within the vapor generator.

FIGURE 6 is a cross-section taken along line 6—6 of FIGURE 5.

FIGURE 7 is a schematic diagram of the control and by-pass circuitry connected to the tube side of the control heat exchangers.

FIGURE 8 is a temperature-enthalpy diagram describing the operation of the invention.

FIGURE 9 is an enlarged cross-sectional view of a part of the fin-tube wall forming the inner tube chamber.

Figure 1:
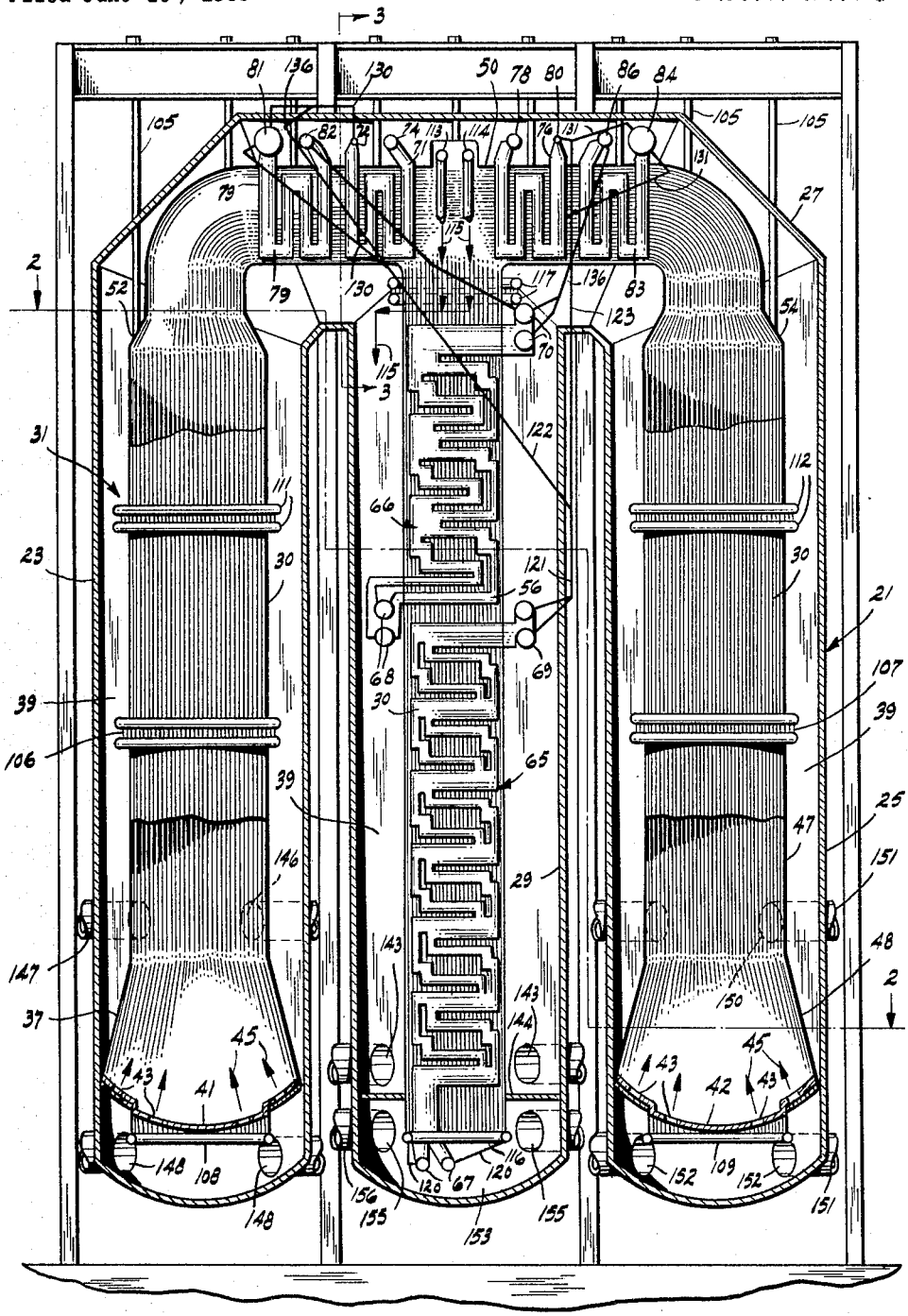
FIGURE 1 is a front, sectional front view partially schematic of a supercharged steam generator in accordance with the invention.

Referring now to the drawings and more particularly to FIGURE 1, an outer containment shell 21 is used to enclose the supercharged, once-through generator. A left vertical portion 23, a right vertical portion 25, a horizontal portion 27, and a central vertical portion 29 form the outer containment shell 21. The horizontal portion 27 is used to connect the upper ends of the left vertical portion 23, the right vertical portion 25, and the central vertical portion 29.

Within the outer containment shell 21 which preferably is cylindrical is a chamber 30 formed of tubes 33 with fins 35 located between the tubes 33. Between the outer containment shell 21 and the chamber 30, a space 39 is formed which serves as an air passageway.

Within the left vertical portion 23 of the outer containment shell 21 is the left vertical section 31 of the chamber 30. The left vertical section 31 is preferably cylindrical. Extending from the lower end of the left vertical section 31, which also preferably is cylindrical, is a diverging or bell-shaped extension 37. The largest cross-sectional area of the bell-shaped extension 37 extends outward in very close proximity to the inside of the outer containment shell 21.

A right vertical section 47, which is virtually identical with the left furnace section 31 is located within the right vertical portion 25. Similar to the left vertical section 31, the right vertical section has a diverging or bell-shaped extension 48.

A left dish-shaped burner member or plate 41 and a right dish-shaped burner member or plate 42, preferably identical in shape and form, are located respectively at the lower ends of the left and right bell-shaped extensions 37, 48. The dish-shaped burner plates 31, 42, define burner ports 43. The ports 43 are evenly spaced about two concentric circles on each of the dish-shaped burner members 41, 42. Due to the bell-shaped extensions 37, 48 and the location of the burner ports 43, each group of burners 45 is directed approximately at a common point along the longitudinal axis of the vertical section of the chamber 30 below which it is located. This burner arrangement results in excellent flame distribution. The bell-shaped extensions 37, 48 are lined with a refractory material (not shown) since the heat concentration in these areas is very intense.

Within the horizontal portion 27 of the outer containment shell 21 is a horizontal section 50 of the chamber 30. The horizontal section 50 is preferably square in cross section. In order to connect the horizontal section 50 to the left section 31, a left tapered adapter 52 is used. A right tapered adapter 54, similar to the left tapered adapter 52, connects the right section 47 to the horizontal section 50.

A central vertical section 56 which also is preferably square in cross-sectional area is located within the central vertical portion 29. The upper end of the central vertical section 56 is connected to the horizontal section 50. The lower end of the central vertical section 56 is open.

Located in the lower part of the central, vertical section 56 are primary superheater banks 65. Primary superheater inlets 67 are located beneath and connected to the lower end of primary superheater bank 65. Primary superheater outlets 69 are located adjacent and connected to the upper end of the primary superheater banks 65.

Located in the upper part of the central section 56, directly above the primary superheater banks 65, are finishing reheater banks 66. Finishing reheater outlets 68 are located adjacent the lower end of the finishing reheater banks 66. Finishing reheater inlets 70 are located adjacent the upper end of the finishing superheater banks.

A left finishing superheater bank 71 of pendant design is located just off center within the horizontal section 50 toward the left vertical section 31. The left finishing superheater bank 71 has an inlet 72 adjacent the side nearest the left section 31 and an outlet 74 adjacent the center of the horizontal section 50. A right finishing superheater bank 76 of pendant design is symmetrically located with the left finishing superheater bank 71 about the center of and within the horizontal section 50. The right finishing superheater bank 76 has an outlet 78 adjacent the center of the horizontal section 53 and an inlet 80 at its end nearest the right vertical section 47.

A left primary reheater 79 of pendant design utilizes the space within the horizontal section 53 between the left vertical section 31 and the left finishing superheater bank 71. The inlet to the left primary reheater 79 is a left control heat exchanger 81. The left control heat exchanger 81 is connected to the end of the left primary reheater 79 adjacent the left section 31. A left primary reheater outlet 82 is connected to the end of the left primary reheater 79 adjacent the left finish superheater bank 71.

A right primary reheater 83 of pendant design utilizes the space within the horizontal section 50 between the right section 47 and the right finishing superheater bank 76. The inlet to the right primary reheater 83 is a right control heat exchanger 84, which is identical in form to the left control heat exchanger 81, and is shown in FIGURES 5 and 6. The right inlet control heat exchanger 84 is connected to the end of the right primary reheater 83 adjacent the right vertical section 47. A right primary reheater outlet 86 is connected to the end of the right primary reheater 83 adjacent the right finishing superheater bank 76.

A shell 89 encloses the outside of the heat exchangers 81, 84. U-shaped tubes 90 are located within the shell 89 and are connected to a tube-side compartment 91 through a tube sheet 92. The tube-side compartment 91 is formed from a tube-side enclosure 93. A manhole 94 is provided through the enclosure 93 and a high-pressure vapor inlet 95 and high-pressure vapor outlet 96 are also provided through the enclosure 93. A partition 97 separates the inlet 95 from the outlet 96, forcing the high-pressure vapor through the U-tubes 90. Low pressure vapor is admitted to the shell side through a shell-side inlet 98. The low-pressure vapor is dispersed over the entire U-tube bank 90 by a perforated sheet 99 located directly in the path of flow of the low-pressure vapor passing through the low-pressure vapor inlet 98. The low-pressure vapor, after passing over the U-tubes 90 leaves the shell 89 through tubes 100 which are part of either the left primary reheater bank 79 or the right primary reheater bank 83.

The entire steam generator is top supported by eight corner vertical posts 101, having two-side cross beams 102 and four end beams 103. The entire outer shell 21 as well as the chamber 30 are supported from the top by the side and end cross beams 102 and 103. This is accomplished by means of a series of stringers 105 on which the entire unit is suspended. This support arrangement is extremely advantageous in that no access openings are required through the outer containment shell 21 since holes can be cut and rewelded when needed. In addition, the left and right vertical sections 31, 47 can expand without causing any stress or strain.

A left ring-shaped inlet header 108 is located below the left burner plate 41. A right ring-shaped inlet header 109 is located beneath the right burner member 42. Both inlet headers 108, 109 are connected to a source of vaporizable fluid which first is preheated in an economizer 110 shown in FIGURE 4. The vaporizable fluid, after passing through the economizer 110, is fed in approximately equal quantities to the left ring-shaped inlet header 108 and the right ring-shaped inlet header 109. The quantity of vaporizable fluid introduced through the left ring-shaped inlet header 108 flows upward into the tubes 33 of the left section 31 which are connected to it. A lower left-section header 106 located toward the middle of the left vertical section 31 serves to remove enthalpy unbalance from the vaporizable fluid in the tubes 33. Similarly, a right section header 107 is located in the middle of the right vertical section 47. To subsequently remove enthalpy unbalance, an upper left-section header 111 is located toward the upper end of the left vertical section 31 and an upper right-section header 112 is located toward the upper end of the right vertical section 47. The quantity of vaporizable fluid introduced through the right ring-shaped inlet header flows upward into the tubes 33 of the right section 47 which are connected to it. From the left section header 111 and the right-section header 112 the flow of vaporizable fluid continues upward through the tubes 33 of the left vertical section 31 and the right vertical section 47 and into the horizontal section 50. The vaporizable fluid from the left vertical section 31 which flows into the tubes 33 located in the top half of the horizontal section 50 flows into a left collection header 113. The vaporizable fluid from the right vertical section 47 which flows into the tubes 33 located in the top half of the horizontal section 50 flows into a right collection header 114. The vaporizable fluid passing into the left collection header 113 and into the right collection header 114 is merged into a conduit 115 which is connected to a ring-shaped outlet header 116 located in the bottom of the central vertical portion 29 and below the lower end of the central vertical section 56.

The vaporizable fluid flowing through the horizontal section 50 which does not enter the left collection header 113 or the right collection header 114 flows into the tubes 33 of the central vertical section 56. Located toward the top of the central section 55 is a pair of central headers 117 which remove any enthalpy unbalance developed subsequent to the left-section header 111 and the right-section header 112.

From the bottom of the central vertical section 56, the flow of fluid continues to the ring-shaped outlet header 116. The flow of vapor from the conduit 115 and the central vertical section 56 mixes in the ring-shaped outlet header 116.

The ring-shaped outlet header 116 is connected by means of conduits 120 to the primary superheater inlets 67. The vapor flows upward through the primary superheater banks 65 and out the primary superheater outlets 69. Connected to the primary superheater outlets 69 is a conduit 121 which divides into a left branch 122 and a right branch 123. The left branch 122 connects to the inlet 72 of the left secondary superheater bank 71. The right branch 123 is connected to the inlet 80 of the right secondary superheater bank 76. From the outlet 74 of the left superheater bank 71 and the outlet 78 of the right superheater bank 76, the superheated vapor is supplied to a turbine 125 shown in FIGURE 4 which has a high-pressure stage 126, an intermediate-pressure stage 127, and a low-pressure stage 128. All three stages 126, 127, 128 are connected to an electric generator 129.

A by-pass 130 is connected at both ends to the branch 122 and a by-pass 131 is connected to the branch 123. The by-pass 130 is connected to the tube side of the left control heat exchanger 81. The by-pass 131 is connected to the tube side of the right control heat exchanger 84. In this way, the hot, high-pressure vapor supplies a source of heat to the control heat exchangers 81, 84 which maintains a constant reheat vapor temperature. A left control valve 133 and a right control valve 134 in the by-pass 130 and 131 respectively, maintain the proper flow of hot, high-pressure vapor to obtain the desired reheat temperature.

After expansion of the superheated vapor in the high pressure stage 126, the partially expanded vapor is reheated by parallel flow through the left primary reheater 79 and the right primary reheater 83, followed by the finishing reheater 66. The partially expanded vapor is separated in two substantially equal quantities. One of the quantities is passed through the shell side of the left control heat exchanger and into the left primary reheater 79. The other quantity is passed through the shell side of the right control heat exchanger 84 and into the right primary reheater 83. From the left primary reheater outlet 82 and the right primary reheater outlet 86, the partially expanded vapor is recombined and conveyed by means of a conduit 136 to the secondary reheater inlet 70. After passing through the secondary reheater banks 66 the vapor passes from the secondary reheater outlets 68 to the intermediate-pressure stage 127 and the low-pressure stage 128 of the turbine 125. Following expansion in the intermediate-pressure stage 127 and the low-pressure stage 128, the expanded vapor is condensed in a condenser 138. The condensed liquid is then forced by a condensate pump 139 through a series of low-pressure heaters 140 and a feed pump 142 to the economizer 110 from which the heating cycle again begins.

Figure 4:
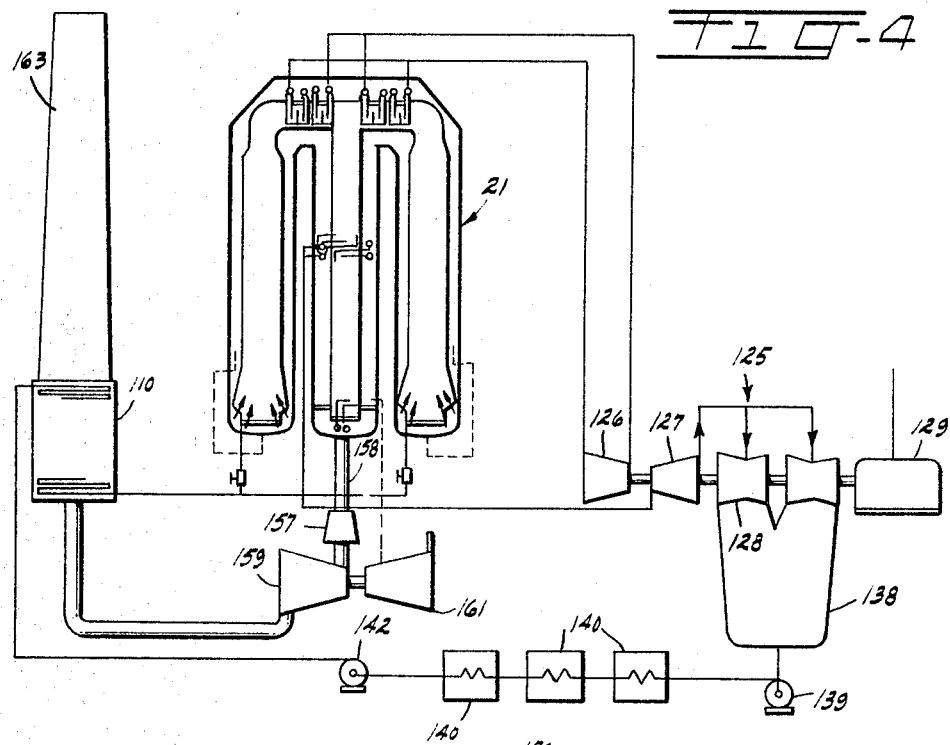
FIGURE 4 is a schematic diagram showing the circuitry arrangement of the supercharged, once-through vapor generator in an electric power generating system.
Figure 2:
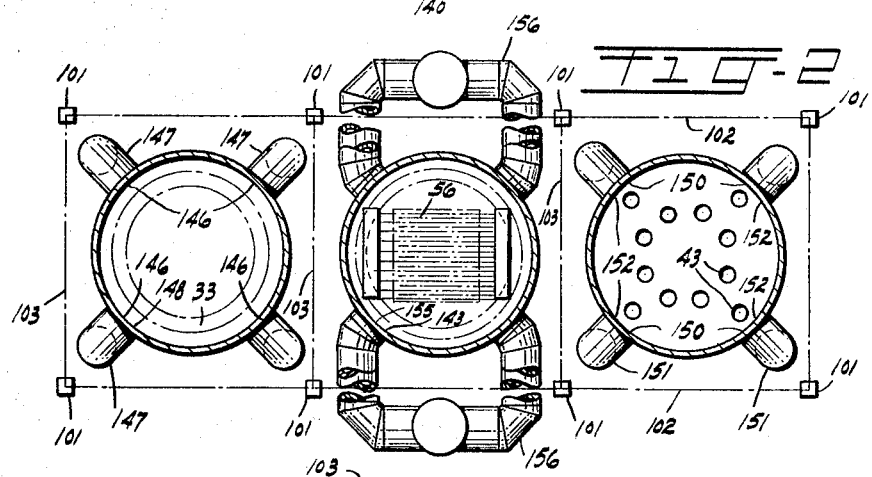
FIGURE 2 is a cross-sectional view taken along line 2—2 of FIGURE 1.
Figure 3:
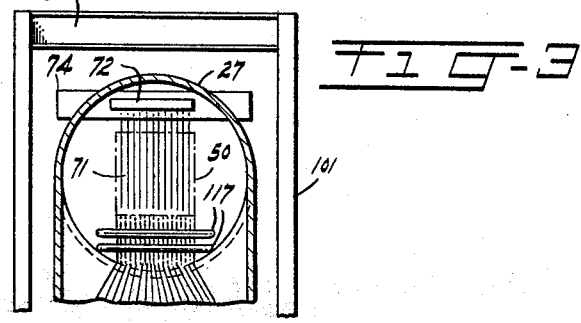
FIGURE 3 is a cross-sectional view taken along line 3—3 of FIGURE 1.

In considering the fluid circuit arrangement shown in FIGURE 4, comparison with FIGURE 8 is advisable. In FIGURE 8, a temperature-enthalpy diagram is shown for a vapor generator arranged as shown in FIGURE 4 which utilizes water as the vaporizable fluid. The cycle steam conditions are 3500 p.s.i., 1000° F. superheat, 1000° F. single reheat, with a gross terminal output of 480 mw. from the steam-turbine generator. However, this is only by way of example, as this invention may be utilized with other cycle conditions and different capacities and in a power plant in which a portion of the electric power is obtained from the gas turbine.

The first pass shown in FIGURE 8, is from the left ring-shaped inlet header 108 to the lower left-section header 106 and from the right ring-shaped inlet header 109 to the lower right-section header 107 as seen in FIGURE 1. The second pass is from the lower left-section header 106 to the upper left-section header 111 and from the lower right-section header 107 to the upper right-section header 112. The third pass is from the upper left-section header 111 and the lower right-section header 112 to the left and right collection headers 113, 114 and the central headers 117. The pass from these points to the ring shaped outlet header 116 is labeled "ENCL" in FIGURE 8. All other labels on FIGURE 8 appear to be self-explanatory.

The central vertical portion 29 of the outer containment shell 21 defines four air inlet ports 143 which are located toward the lower end of the central flue portion 29 just above the end of the central section 55. A baffle 144 most preferably in the form of a flat ring-shaped plate, extends radially from the end of the central section 55 to the central vertical portion 29 preventing the downward flow of air introduced through the air inlet ports 143. Instead, the air is fed upward through space 39. At the top of the central vertical portion 29 the air flow separates in two streams, one of which flows downward through the space 39 in the left vertical portion 23 and the other of which flows downward within the space 39 within the right vertical portion 25. Due to the left bell-shaped extension 37, the space 39 in the left vertical portion 39 discontinues so the air is by-passed through four left air exit ports 146 into four left air conduits 147 and back through the left vertical portion 23 by means of four left air re-entrance ports 148. Similarly, since the space 39 in the right vertical portion 25 discontinues due to the right bell-shaped extension 48, so the air is by-passed through four right air exit ports 150 into four right air conduits 151 and back through the right vertical portion 25 by means of four right air re-entrance ports 152. Since the left vertical portion 23 and the right vertical portion 25 are enclosed at their lower ends, the compressed air is forced into the burners 45.

The hot gases of combustion flow upward through the left section 31 and the right section 47 and merge in the horizontal section 50 before flowing downward through the central vertical section 55. Since the lower end of the central vertical section 56 is open the hot gases flow out into a chamber 153 formed by the closed end of the central vertical portion 29 and the baffle 144. Four gas outlet ports 155 in the central portion 29 which communicate with the chamber 153 serve to discharge the hot gases. The gases are then passed by means of connectors 156 into an afterburner 157 through a conduit 158 and then into a gas turbine 159. The afterburner 157 serves to provide any additional heat input required to operate the gas turbine 159 but primarily serves to control the operation of the gas turbine rather than provide substantial added power. Mechanically coupled to the gas turbine 159 is an air compressor 161 which provides the compressed air supplied to the air inlet ports 143. The hot gases are discharged from the gas turbine 159 and sent to the economizer 110 to preheat the vaporizable fluid and are then discharged through a stack 163.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A vapor generator for use in a power plant which includes a gas turbine with an afterburner, a vapor turbine, and an air compressor driven by the gas turbine, comprising:

fluid heating tubes with fins therebetween defining a chamber, said chamber including a left vertical section, a right vertical section, a central vertical section between the left vertical section and right vertical section, and a horizontal section connecting the upper ends of said left vertical section and said right vertical section and said central vertical section;

means for supplying a vaporizable fluid to said fluid heating tubes at the lower ends of said left vertical section and said right vertical section;

burner means located at the lower ends of said left vertical section and said right vertical section of said chamber for supplying heating gases to said chamber for flow therethrough;

an outer containment shell for surrounding said enclosure;

means partially coextensive with said enclosure and outer containment shell for supplying air from said compressor to said burner means;

means for discharging said heating gases partially coextensive with said outer containment shell and connected to the lower end of said central vertical section and to said gas turbine through said afterburner;

means for structurally supporting said chamber and outer containment shell;

a primary superheater means located within and toward the lower end of said central vertical section and connected for series flow of fluid from said fluid heating tubes at the lower end of said central vertical section;

a secondary superheater means located within said horizontal section and connected for series flow of fluid from said primary superheater means and to said vapor turbine;

a primary reheater means located within the horizontal section of said chamber and connected for series flow of fluid from said vapor turbine;

a secondary reheater means located within said central vertical section above said primary superheater means; and means for controlling the temperature of the fluid from said secondary reheater means to said vapor turbine.

2. A vapor generator according to claim 1 wherein said means for controlling the temperature of the fluid from said secondary reheater means includes a heat exchanger adapted to supply heat to the fluid passing into said primary reheater means.

3. A vapor generator for use in a power plant which includes a gas turbine with an afterburner, a vapor turbine, and an air compressor driven by the gas turbine, comprising:

fluid heating tubes with fins therebetween defining a chamber, said chamber including a left vertical section, a right vertical section, a central vertical section between the left vertical section and the right vertical section and a horizontal section connecting the upper ends of said left vertical section and said right vertical section and said central vertical section;

burner means located at the lower ends of said left vertical section and said right vertical section of said chamber for supplying heating gases to said chamber for flow therethrough;

an outer containment shell surrounding said enclosure;

means partially coextensive with said enclosure and said outer containment shell for supplying air from said compressor to said burner means;

means for structurally supporting said chamber and outer containment shell;

a primary superheater means located within and toward the lower end of said central vertical section and connected for series flow of fluid from said fluid heating tubes at the lower end of said central vertical section;

a secondary superheater means located within said horizontal section and connected for series flow of fluid from said primary superheater means and to said vapor turbine;

means for by-passing and returning a portion of the fluid being conveyed from said primary superheater means for said secondary superheater means;

a primary reheater means located within the horizontal section of said chamber;

a heat exchanger means of the shell and tube type for controlling the temperature of the reheated fluid by adding the required heat to the reheat fluid by transferring said heat from the portion of fluid by-passed and returned from between said primary superheater means and said secondary superheater means, said means for by-passing and returning being connected to the tube side of said heat exchanger, the shell side of said heat exchanger means being connected for series flow from said turbine and to said primary reheater means;

a secondary reheater means located within said central vertical section above said primary superheater means; and a temperature control valve means located in series with the tube side of said heat exchanger and adapted to be actuated by the outlet temperature of said secondary reheater.

4. A vapor generator for use in a power plant which includes a gas turbine with an afterburner, a vapor turbine, and an air compressor driven by the gas turbine, comprising:

fluid heating tubes defining a chamber, said chamber including a left vertical section having a diverging lower end extension, a right vertical section having a diverging lower end extension, a central vertical section located between said left vertical section, and said right vertical section, and a horizontal section connecting the upper ends of said left vertical section and said right vertical section and said central vertical section;

means for supplying a relatively cool vaporizable fluid to said fluid heating tubes;

burner means located at the lower ends of said diverging lower end extensions of said left and right vertical sections of said chamber for supplying heating gases to said chamber for flow therethrough to vaporize said relatively cool vaporizable fluid;

an outer containment shell encasing said chamber, said left vertical section from its upper end to the location of its burner means, said outer containment shell and chamber defining an air passageway therebetween extending along said horizontal section and central vertical section and said left and right vertical sections from the horizontal section to the diverging lower end extensions, said diverging end extensions extending substantially out to said outer containment shell;

means for supplying compressed air from said air compressor to said air passageway;

means partially coextensive with said outer containment shell for supplying compressed air from said air passageway to said burner means;

means partially coextensive with said outer containment shell and in communication with the lower end of said central vertical section and connected to said gas turbine through said afterburner for discharging the gases from said chamber to said gas turbine;

means for structurally supporting said chamber and outer containment shell;

a primary superheater means located within and toward the lower end of said central vertical section and connected for series flow of fluid from said fluid heating tubes at the lower end of said central vertical section;

a finishing superheater means located within said horizontal section and connected for series flow of fluid from said primary superheater means and to said vapor turbine;

means for by-passing and returning a portion of the fluid being conveyed from said primary superheater means to said finishing superheater means;

a primary reheater means located within the horizontal section of said chamber;

a heat exchanger means of the shell and tube type for controlling the temperature of the reheated fluid by adding the required heat to the reheated fluid by transferring heat from the portion of fluid by-passed and returned from between said primary superheater means and said finishing superheater means, said means for by-passing and returning being connected to the tube side of said heat exchanger, the shell side of said heat exchanger means being connected for series flow from said turbine and to said primary reheater means;

a secondary reheater means located within said central vertical section above said primary superheater means; and a temperature control valve located in series with the tube side of said heat exchanger and adapted to be actuated by the outlet temperature of said second reheater.

5. A vapor generator for use in a power plant which includes a gas turbine with an afterburner, a vapor turbine, and an air compressor driven by the gas turbine, comprising:

fluid heating tubes defining a chamber, said chamber including a left vertical section and a right vertical section and a central section and a horizontal section which connects the upper ends of said left vertical section and said right vertical section and said central vertical section and includes a collection header, said left and right vertical sections being cylindrical and having bell-shaped extensions which are open at their lower ends;

a pair of dish-shaped circular members, each one of said pairs enclosing the lower end of a separate one of said bell-shaped extensions, each of said dish-shaped circular members defining burner ports evenly located about two concentric circles;

a pair of inlet headers, each one of said pair being located adjacent and beneath a separate one of said dish-shaped members and being connected to said fluid heating tubes at the lower end of the respective vertical section beneath which it is located to supply a vaporizable fluid to said fluid heating tubes;

means for supplying vaporizable fluid to said inlet headers;

a multiplicity of burners each located in one of said burner ports and directed upward and inward approximately toward a common point on the longitudinal axis of the vertical section beneath which it is located;

an outer containment shell of circular cross section encasing said chamber, said outer containment shell and chamber defining an air passageway therebetween extending along said central vertical section and said horizontal section and both said left and right vertical sections from the horizontal section to the lower end of said bell-shaped extensions, said bell-shaped extensions extending outward substantially to said outer containment shell, said outer containment shell defining air exit means adjacent and above both bell-shaped extensions and air re-entrance means below and adjacent both bell-shaped extensions and defining a heating gas exit means located below the lower end of said central vertical section for discharging heating gas to the gas turbine through the afterburner and further defining an air entrance means located adjacent and above the lower end of said central vertical section for introducing air from said air compressor;

partition means extending radially between said central vertical section and said outer containment shell adjacent said lower end of said central vertical section and located between said air entrance means and said gas exit means of said outer containment shell to separate said air entrance means from said gas exit means;

means for connecting said air exit means to said air re-entrance means adjacent the same vertical section to convey the air flowing through said air passageway to said burners and around the respective bell-shaped extension;

means for structurally suspending said chamber and said outer containment shell;

an outlet header located beneath the lower end of said central vertical section and connected to said fluid heating tubes at the lower end of said central vertical section and to said collection header for receiving the fluid from said fluid heating tubes, a portion of said fluid heating tubes being adapted for flow directly from said inlet headers to said outlet header and the remaining of said fluid heating tubes being adapted for flow from said inlet headers to said collection header;

a primary superheater means located within and toward the lower end of said central vertical section and connected for series flow of fluid from said outlet header;

a finishing superheater means located within said horizontal section and connected for series flow of fluid from said primary superheater means to said vapor turbine;

means for by-passing and returning a portion of the fluid conveyed from said primary superheater means to said finishing superheater means;

a primary reheater means located within the horizontal section of said chamber;

a heat exchanger means of the shell and tube type for controlling the temperature of the reheat fluid by adding the required heat to the reheat fluid by transferring heat from the portion of fluid by-passed and returned from between said primary superheater means and said finish superheater means, said means for by-passing and returning being connected to the tube side of said heat exchanger, the shell side of said heat exchanger means being connected for series flow from said turbine to said primary reheater means;

a finishing reheater means located within said central vertical section above said primary superheater means; said finishing reheater means being connected for series flow from said primary reheater means and to said vapor turbine; and a temperature control valve located in series with the tube side of said heat exchanger and adapted to be actuated by the outlet temperature of said second reheater.

6. A vapor generator for use in a power plant which includes a gas turbine with an afterburner, a vapor turbine, and an air compressor driven by the gas turbine, comprising:

fluid heating tubes defining a chamber, said chamber including a left cylindrical vertical section with a bell-shaped lower extension open at the lower end and a right cylindrical vertical section with a bell-shaped lower extension open at the lower end and a central rectangular vertical section open at the lower end and a rectangular horizontal section connecting the upper ends of said rectangular vertical section and said left and right cylindrical vertical section, said rectangular horizontal section including a collection header;

a pair of dish-shaped circular members, one of said pair enclosing the lower end of each bell-shaped extension, each of said dish-shaped circular members defining burner ports evenly located about two concentric circles;

a pair of ring-shaped inlet headers, each of said pair being located adjacent and beneath a separate one of said dish-shaped members and being connected to said fluid heating tubes at the lower end of the cylindrical vertical section beneath which it is located for supplying a vaporizable fluid to said fluid heating tubes;

means for supplying vaporizable fluid to said ring-shaped inlet headers;

a multiplicity of burners each located in one of said burner ports and directed upwardly and inwardly approximately toward a common point on the longitudinal axis of the cylindrical vertical section beneath which it is located;

an outer containment shell of circular cross section encasing said chamber, said outer containment shell and chamber defining an air passageway therebetween extending along said central rectangular vertical section and said rectangular horizontal section and both said left and right vertical cylindrical sections from the rectangular horizontal section to said bell-shaped extensions, said bell-shaped extensions extending outward substantially to said outer containment shell, said outer containment shell defining a plurality of exit ports adjacent and above both bell-shaped extensions and a plurality of air re-entrance ports below and adjacent both bell-shaped extensions and a plurality of heating gas exit ports located below the lower end of said central rectangular vertical section for discharging heating gas to the gas turbine through the afterburner and further defining a plurality of air entrance ports located adjacent and above the lower end of said central rectangular vertical section for introducing air from said air compressor;

partition means including a flat ring-shaped plate extending radially between said central rectangular vertical section and said outer containment shell adjacent said lower end of said central rectangular vertical section and located between said plurality of air entrance ports and said plurality of gas exit ports of said outer containment shell to separate said plurality of gas exit ports of said outer containment shell to separate said plurality of air entrance ports from said plurality of gas exit ports;

conduits for connecting said plurality of air exit ports to said plurality of air re-entrance ports adjacent the same cylindrical vertical section to convey the air flowing through said air passageway to said burners and around the respective bell-shaped extension;

means including a plurality of vertical posts and horizontal beams supported by said vertical posts with rods extending vertically downward from said horizontal beams and connected to said chamber and said outer containment shell for supporting said chamber and outer containment shell;

a ring-shaped outlet header located beneath the lower end of said central rectangular vertical section and connected to said fluid heating tubes at the lower end of central rectangular vertical section and to said collection header for receiving the fluid from said fluid heating tubes, a portion of said fluid heating tubes being adapted for flow directly from said ring-shaped inlet headers to said ring-shaped outlet header and the remaining of said fluid heating tubes being adapted for flow from said ring-shaped inlet headers to said collection header;

a primary superheater bank located within said central rectangular vertical section of said chamber and extending upward from the lower end of said central rectangular vertical section;

a primary superheater inlet header conected to the lower end of said primary superheater and located adjacent the lower end of said primary superheater bank and adjacent said ring-shaped outlet header;

means for connecting said ring-shaped outlet header to said primary superheater inlet header;

a primary superheater outlet header connected to the upper end of said primary superheater and located adjacent the upper end of said primary superheater bank;

a left finishing superheater bank located within said rectangular horizontal section adjacent said central rectangular vertical section and toward said left cylindrical vertical section;

a left finishing superheater inlet connected to the end of said left finish superheater bank located toward said left cylindrical vertical section;

a right finishing superheater bank located within said rectangular horizontal section adjacent said central rectangular vertical section and toward said right cylindrical vertical section;

a right finishing superheater inlet connected to the end of said right finishing superheater bank located toward said right cylindrical vertical section;

means for connecting said primary superheater outlet header with both said left finishing superheater inlet header and said right finishing superheater inlet header, said connecting means including two separate by-pass and return means, one of said by-pass and return means being from the connecting means to said left finishing superheater inlet header and the other one of said by-pass and return means being from the connecting means to said right finish superheater inlet header;

a left finishing superheater outlet header connected to said left finish superheater bank;

a right finishing superheater outlet header connected to said right finish superheater bank;

means for connecting said left and right finishing outlet headers to said vapor turbine;

a left primary reheater bank located within said rectangular horizontal section adjacent said left cylindrical vertical section;

a left control heat exchanger of the shell and tube type connected through its shell side to the end of said left primary reheater bank nearest to said left cylindrical vertical section; the tube side of said left control heat exchanger being connected to the by-pass and return means from the connecting means to said left finishing superheater inlet header;

a right primary reheater bank located within said rectangular horizontal section adjacent said right cylindrical vertical section;

a right control heat exchanger of the shell and tube type connected through its shell side to the end of said right primary reheater bank nearest said right cylindrical vertical section, the tube side of said right control heat exchanger being connected to the by-pass and return means from the connecting means to said right finishing superheater inlet header;

means for connecting said left and right control heat exchangers to said vapor turbine to convey partially expanded fluid through said left and right control heat exchangers in parallel flow;

a left primary reheater outlet header connected to the end of said left primary reheater bank farthest from said left cylindrical vertical section;

a right primary reheater outlet header connected to the end of said right primary reheater bank farthest from said right cylindrical vertical section;

a finishing reheater bank located within said control vertical section above said primary superheater bank;

a finishing reheater inlet header connected to the upper end of said finishing reheater bank;

means for connecting said left and right primary reheater outlet headers to said finishing reheater inlet header;

a finishing reheater outlet header connected to the lower end of said finishing reheater bank;

means for connecting said finishing reheater outlet header to said vapor turbine for further expansion of said reheater fluid; and a left temperature control valve connected in series with said left control heat exchanger and a right temperature control valve connected in series with the tube side of said right control heat exchanger, said left and right temperature control valves being adapted to be actuated by the outlet temperature of the reheated vapor from said finishing reheater bank.

References Cited by the Examiner

UNITED STATES PATENTS 2,946,187   7/1960   Zoschak _____ 60—39.18

MARK NEWMAN, Primary Examiner.

R. D. BLAKESLEE, Assistant Examiner.

UNITED STATES PATENT OFFICE
CERTIFICATE OF CORRECTION

Patent No. 3,263,422                        August 2, 1966

Walter P. Gorzegno

It is hereby certified that error appears in the above numbered patent requiring correction and that the said Letters Patent should read as corrected below.

Column 3, line 33, for "superheater" read -- reheater --.

Signed and sealed this 11th day of June 1968.

(SEAL)
Attest:

Edward M. Fletcher, Jr.                                        EDWARD J. BRENNER
Attesting Officer                                                        Commissioner of Patents